US011309144B1

(12) United States Patent
Lin et al.

(10) Patent No.: US 11,309,144 B1
(45) Date of Patent: Apr. 19, 2022

(54) PRESSING DEVICE

(71) Applicant: SUNREX TECHNOLOGY CORP., Taichung (TW)

(72) Inventors: Shih-Pin Lin, Taichung (TW); Chun-Chieh Chen, Taichung (TW); Ling-Cheng Tseng, Taichung (TW); Yu-Shuo Yang, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 17/147,522

(22) Filed: Jan. 13, 2021

(30) Foreign Application Priority Data

Oct. 6, 2020 (TW) .................................. 109213127

(51) Int. Cl.
*G06F 3/041* (2006.01)
*H01H 13/14* (2006.01)

(52) U.S. Cl.
CPC ........... *H01H 13/14* (2013.01); *G06F 3/0414* (2013.01); *G06F 2203/04105* (2013.01)

(58) Field of Classification Search
CPC .. G06F 3/03547; G06F 1/1616; G06F 1/1637; G06F 2203/04105; G06F 3/0414; G06F 3/04144; G06F 3/0447; H01H 13/14; H01H 13/7065; H01H 13/702; H01H 13/704; H01H 2203/058; H01H 2227/032
See application file for complete search history.

(56) References Cited

U.S. PATENT DOCUMENTS

2017/0329426 A1\* 11/2017 Han ......................... G06F 3/044
2019/0391656 A1\* 12/2019 Togawa .................. G06F 3/045

FOREIGN PATENT DOCUMENTS

TW          I659344        5/2019

\* cited by examiner

*Primary Examiner* — Kent W Chang
*Assistant Examiner* — Scott D Au
(74) *Attorney, Agent, or Firm* — Burris Law, PLLC (57) ABSTRACT

A pressing device includes a base board, an upper board unit that is disposed over the base board, and an intermediate unit that is disposed between the base board and the upper board unit. The upper board unit includes a panel, a circuit board, and a tact switch. The intermediate unit includes a middle portion that corresponds in position to the tact switch, a surrounding frame member, and a plurality of interconnecting board members. When the upper board unit is pressed, at least one of the interconnecting board members is deformed, and the middle portion is driven to convert the tact switch from an initial state to a triggered state.

5 Claims, 8 Drawing Sheets

PRESSING DEVICE

CROSS-REFERENCE TO RELATED APPLICATION

This application claims priority to Taiwanese Utility Model Patent Application No. 109213127, filed on Oct. 6, 2020.

FIELD

The disclosure relates to a pressing device, and more particularly to a pressing device for touchpads.

BACKGROUND

Most of the existing laptops today are equipped with a keyboard and a touchpad or a trackpad as an input interface. Particularly, a touchpad includes a touch-sensitive area for a user to move a cursor on the screen, and also depressible keys to function as a left-click, a right-click and a scroll of a mouse.

Figure 8:
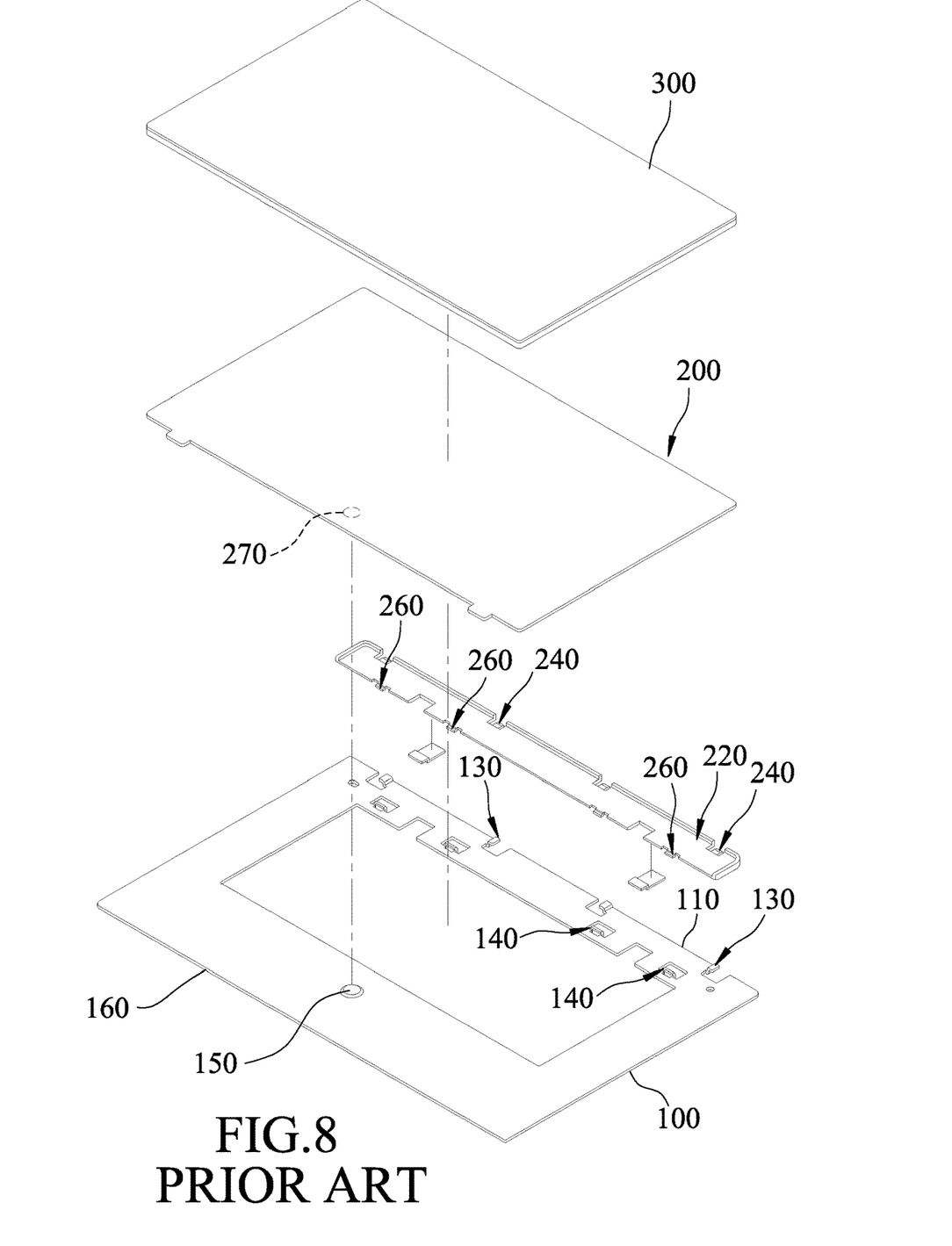
FIG. 8 is an exploded perspective view illustrating a conventional pressing device.

As shown in FIG. 8, a conventional pressing device for touchpads disclosed in Taiwanese Invention Patent No. I659344 includes a base board unit 100, a circuit board 200 and a touch board 300. The base board unit 100 includes a first side portion 110, a plurality of first hook seats 130 formed on the first side portion 110, a plurality of second hook seats 140 formed on the first side portion 110 and located at an inner side of the first hook seats 130, a second side portion 160 opposite to the first side portion 110, and a triggering unit 150 disposed on the second side portion 160. The circuit board 200 includes a holder 220 fixed on the base board unit 100 at the first side portion 110, and an elastic switch 270 disposed on the circuit board 200 to correspond in position to the triggering unit 150. The holder 220 includes a plurality of elastic hooks 240 respectively engaging with the first hook seats 130, and a plurality of limit hooks 260 engaging respectively with the second hook seats 140.

When the side of the circuit board 200 with the elastic switch 270 (the side that corresponds to the second side portion 160) is pressed, the circuit board 200 pivots relative to the base board unit 100 with the limit hooks 260 serving as a pivot axis, so that the elastic switch 270 is compressed by the triggering unit 150 to generate a corresponding signal.

However, when the side of the circuit board 200 which is adjacent to the holder 220 is pressed, the circuit board 200 is unable to pivot relative to the baseboard 100.

SUMMARY

Therefore, an object of the disclosure is to provide a pressing device for touchpads that can alleviate the drawback of the prior art.

According to the disclosure, the pressing device includes a base board, an upper board unit, and an intermediate unit.

The upper board unit is disposed over the base board and includes a panel, a circuit board, and a tact switch. The circuit board is disposed on a bottom portion of the panel. The tact switch is disposed on a bottom portion of the circuit board. The intermediate unit is disposed between the base board and the upper board unit. The intermediate unit includes a middle portion, a surrounding frame member, and a plurality of interconnecting board members. The middle portion corresponds in position to the tact switch of the upper board unit. The surrounding frame member is mounted fixedly to the bottom portion of the circuit board. Each of the interconnecting board members is connected between the middle portion and the surrounding frame member and has a base end surface and a supporting portion. The base end surface faces the base board. The supporting portion protrudes from the base end surface and is connected fixedly to the base board.

When the upper board unit is pressed toward the base board, the supporting portion of at least one of the interconnecting board members is pushed toward the upper board unit by a reaction force to resiliently deform the at least one of the interconnecting board members, thereby driving the middle portion to convert the tact switch from a initial state to a triggered state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
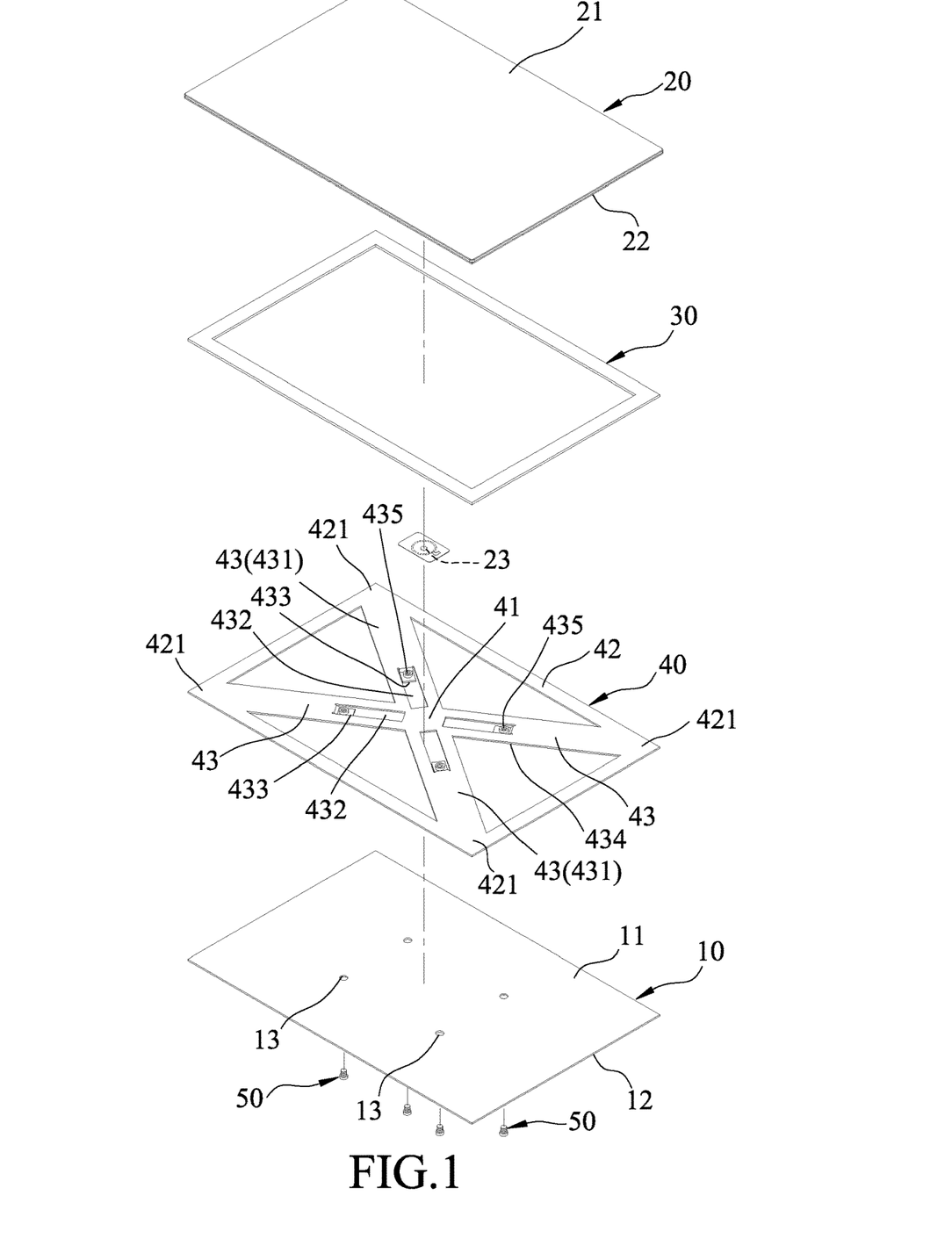
FIG. 1 is an exploded perspective view illustrating an embodiment of the pressing device according to the disclosure.
Figure 2:
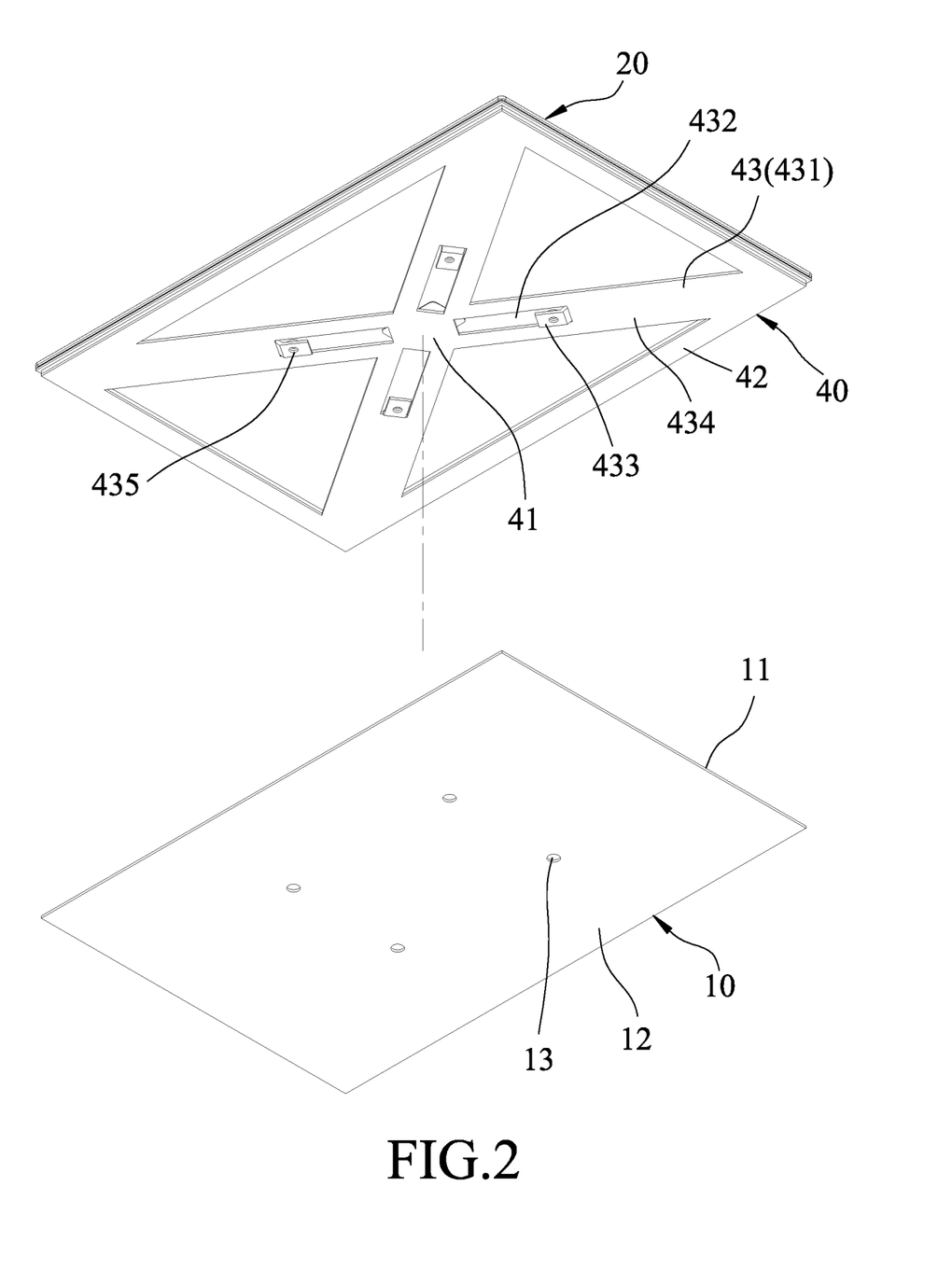
FIG. 2 is a partly exploded perspective bottom view of the embodiment.
Figure 3:
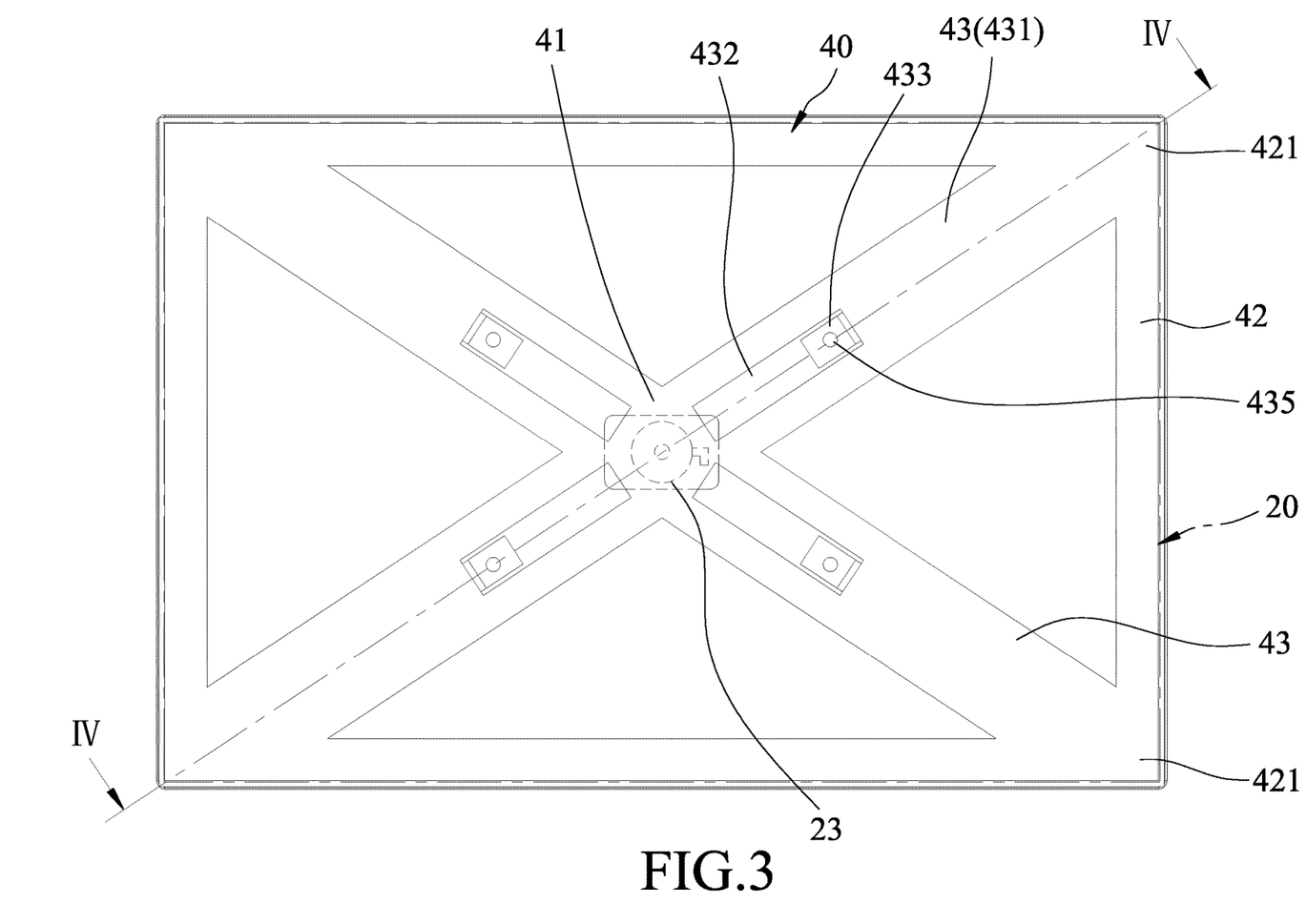
FIG. 3 is an assembled bottom view illustrating an intermediate unit and an upper board unit of the embodiment.

Referring to FIGS. 1 to 3, an embodiment of a pressing device according to the disclosure includes a base board 10, an upper board unit 20, a frame pad 30, an intermediate unit 40, and a plurality of screw members 50.

The base board 10 has a top surface 11, a bottom surface 12 opposite to the top surface 11, and a plurality of through holes 13. Each of the through holes 13 extends from the bottom surface 12 to the top surface 11.

The upper board unit 20 is disposed over the base board 10 and includes a panel 21, a circuit board 22 that is disposed on a bottom portion (i.e., a bottom side) of the panel 21, and a tact switch 23 that is substantially disposed on a center of a bottom portion (i.e., a bottom side) of the circuit board 22.

The frame pad 30 is disposed between the intermediate unit 40 and the circuit board 22 of the upper board unit 20, and is substantially rectangular ring-shaped.

The intermediate unit 40 is disposed between the base board 10 and the frame pad 30 (or between the base board 10 and the circuit board 22 of the upper board unit 20), and includes a middle portion 41 that corresponds in position to the tact switch 23 of the upper board unit 20, a surrounding frame member 42 that is mounted fixedly to the frame pad 30 and further to the bottom portion of the circuit board 22, and a plurality of interconnecting board members 43. In this embodiment, the intermediate unit 40 is made of metal and is configured as a one-piece component. That is to say, the middle portion 41, the surrounding frame member 42, and the interconnecting board members 43 are formed as one piece. The surrounding frame member 42 is substantially rectangular ring-shaped, corresponds in position to the frame pad 30, and includes four corner portions 421. Each of the interconnecting board members 43 is elongated plate-shaped and interconnects the middle portion 41 and a respective one of the corner portions 421 of the surrounding frame member 42. Each of the interconnecting board members 43 includes a main board portion 431, a groove 432 that is formed in the main board portion 431, and a supporting portion 433 that is L-shaped and that is integrally formed with the main board portion 431. The main board portion 431 of each of the interconnecting board members 43 has a base end surface 434 that faces the top surface 11 of the base board 10. The supporting portion 433 of each of the interconnecting board members 43 is spaced apart from the surrounding frame member 42, protrudes from the base end surface 434, corresponds in position to the groove 432, and has a screw hole 435 that is aligned with a respective one of the through holes 13 of the base board 10.

Each of the screw members 50 extends through a respective one of the through holes 13 of the base board 10 and threadedly engages the screw hole 435 of the supporting portion 433 of the respective one of the interconnecting board members 43 of the intermediate unit 40. Therefore, the screw members 50 respectively fasten the supporting portions 433 on the base board 10 so that the supporting portion 433 is connected fixedly to the base board 10.

Figure 4:
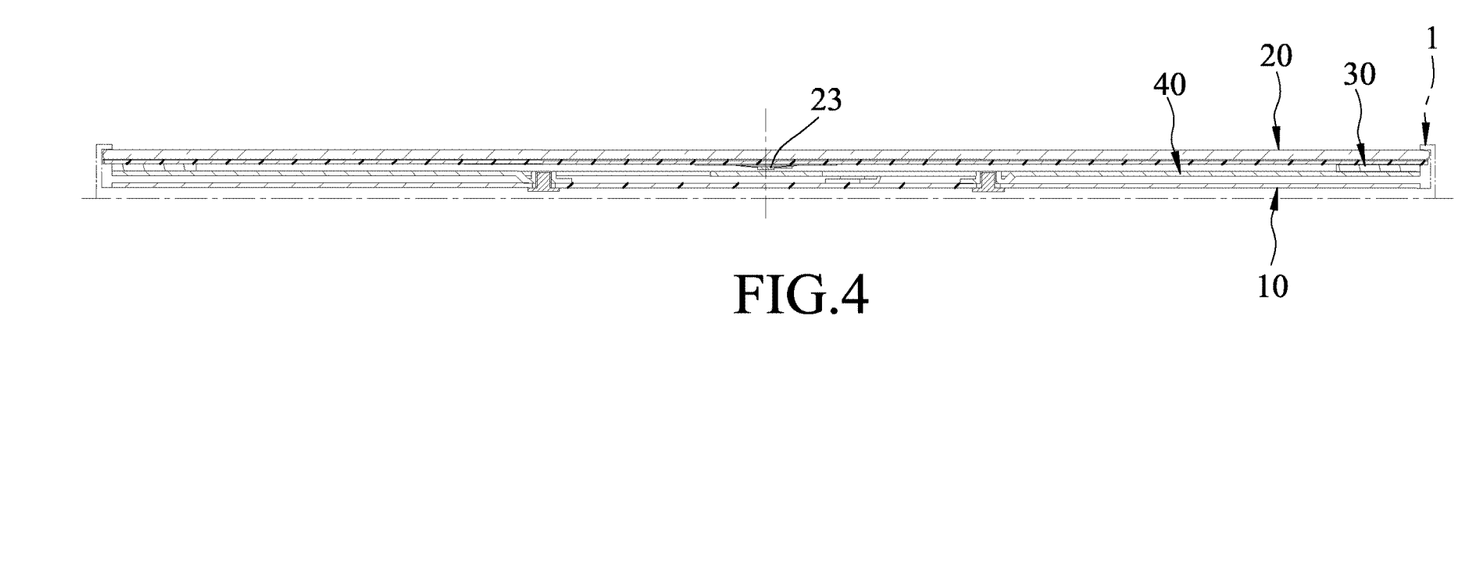
FIG. 4 is a sectional view taken along line IV-IV in FIG. 3 illustrating a tact switch in an initial state.
Figure 5:
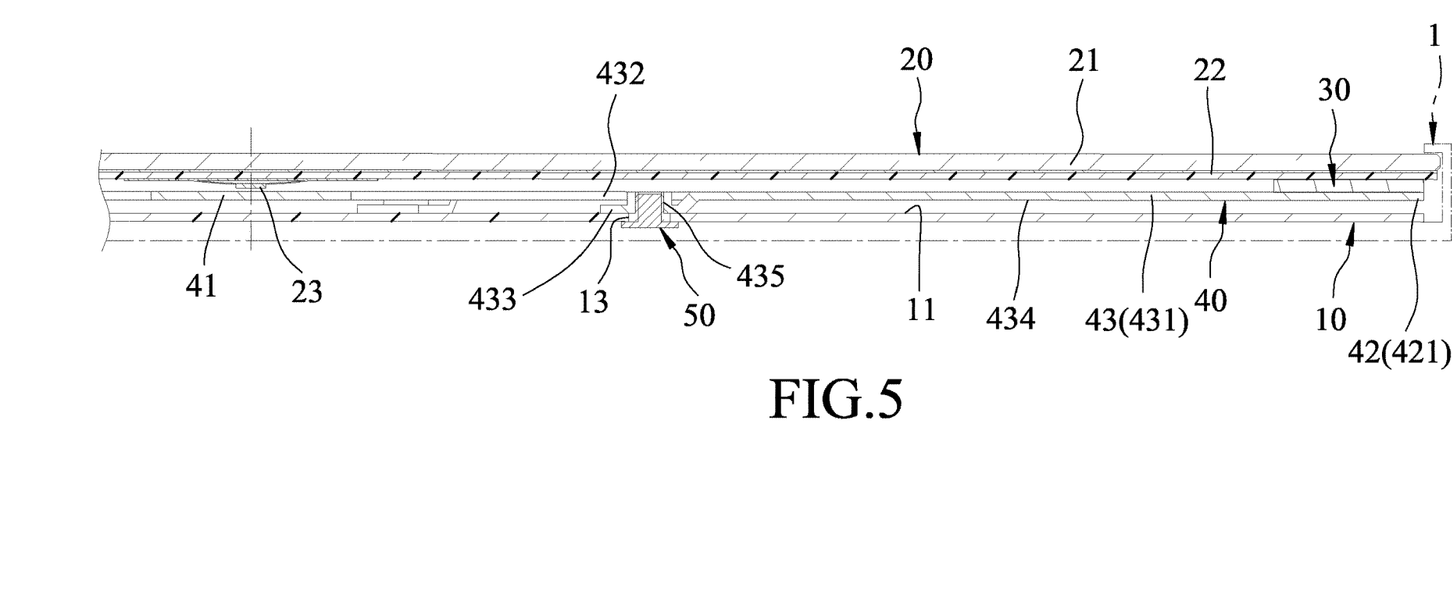
FIG. 5 is an enlarged fragmentary view of FIG. 4.

FIGS. 3 to 7 illustrate how the above-mentioned structures operate. As shown in FIGS. 3 to 5, when no external force is applied on the upper board unit 20, the base end surface 434 of the main board portion 431 of each of the interconnecting board members 43 is spaced apart from the top surface 11 of the base board 10, and there is a gap between the base end surface 434 and the top surface 11 in an up-down direction for the upper board unit 20 to move toward the base board 10. At this time, The tact switch 23 of the upper board unit 20 is not compressed, deformed, or in contact with the middle portion 41 of the intermediate unit 40. The tact switch 23 remains above the middle portion 41. At this moment, the tact switch 23 is at an initial state, and no signal is generated since the tact switch 23 is spaced apart from the middle portion 41.

Figure 6:
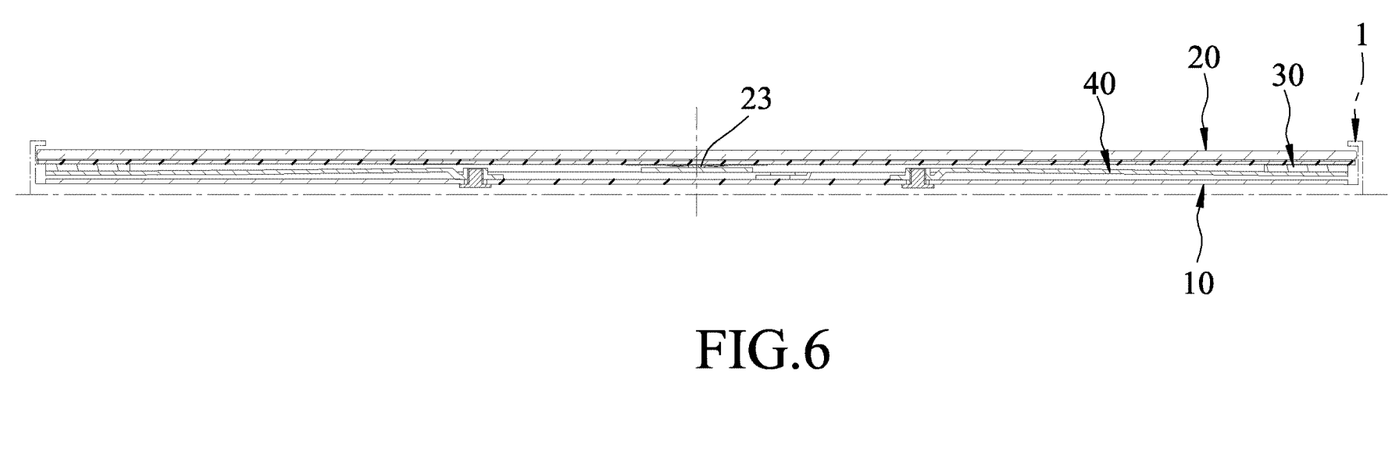
FIG. 6 is a sectional view illustrating the tact switch in a triggered state.
Figure 7:
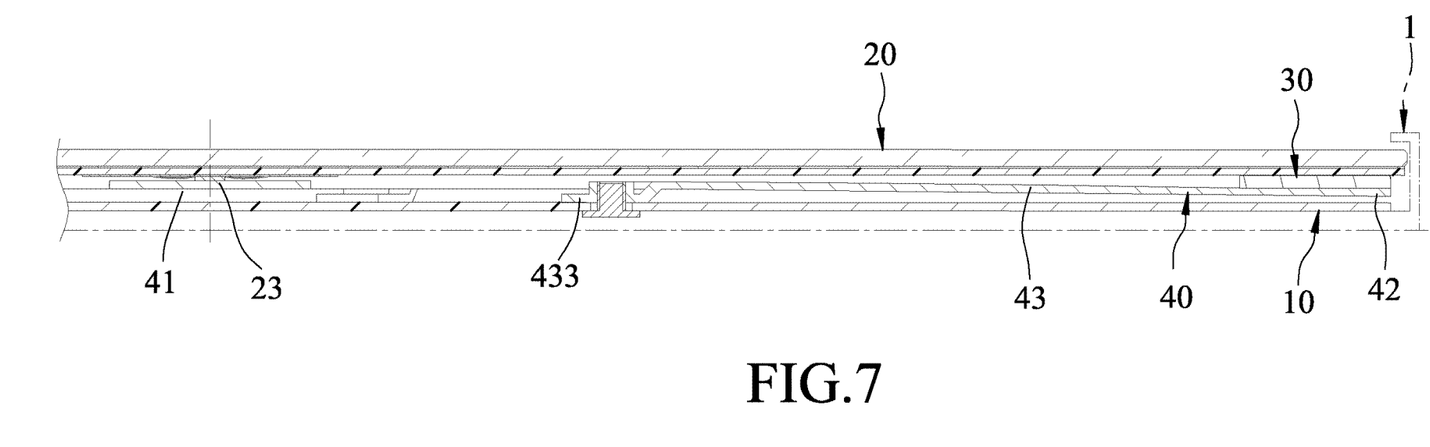
FIG. 7 is an enlarged fragmentary view of FIG. 6.

As shown in FIGS. 3, 6, and 7, when the upper board unit 20 is pressed toward the base board 10 by an external force, the tact switch 23 of the upper board unit 20 and the surrounding frame member 42 of the intermediate unit 40 move toward the base board 10. The movement of the surrounding frame member 42 causes the supporting portion 433 of at least one of the interconnecting board members 43 of the intermediate unit 40 to be pushed toward the upper board unit 20 by a reaction force to resiliently deform the at least one of the interconnecting board members 43 relative to the surrounding frame member 42. Therefore, the middle portion 41 of the intermediate unit 40 is driven to urge the tact switch 23 so as to convert the tact switch 23 from the initial state to a triggered state. A signal is thus generated when the tact switch 23 is at the triggered state.

When the external force ceases to exist, the at least one of the interconnecting board members 43 restores to its initial position relative to the surrounding frame member 42, such that the middle portion 41 of the intermediate unit 40 and the tact switch 23 of the upper board 20 are away from each other as shown in FIGS. 4 and 5.

By virtue of the above-mentioned configuration of the pressing device, the disclosure can effectively convert the tact switch 23 of the upper board unit 20 from the initial state to the triggered state and precisely generate a corresponding signal regardless of what position of the upper board unit 20 is pressed toward the base board 10.

In addition, as shown in FIGS. 4 to 7, the pressing device according to the disclosure further includes a top cover 1 that restricts movement of edges of the upper board unit 20. Thus, wherever the upper board unit 20 is pressed toward the base board 10, the upper board unit 20 will not tilt from any edge.

In summary, the embodiment of the pressing device according to the disclosure provides relatively simple structures and generates a corresponding signal more precisely during use as compared to a conventional pressing device, and therefore the embodiment of the disclosure has alleviated the drawback of the prior art.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A pressing device for a touchpad, comprising:
a base board;
an upper board unit disposed over said base board and including
a panel,
a circuit board that is disposed on a bottom portion of said panel, and
a tact switch that is disposed on a bottom portion of said circuit board; and
an intermediate unit disposed between said base board and said upper board unit, and including
a middle portion that corresponds in position to said tact switch of said upper board unit,
a surrounding frame member that is mounted fixedly to said bottom portion of said circuit board, and
a plurality of interconnecting board members each of which is connected between said middle portion and said surrounding frame member, each of said interconnecting board members having a base end surface that faces said base board, and a supporting portion that protrudes from said base end surface and that is connected fixedly to said base board;

wherein, when said upper board unit is pressed toward said base board, said supporting portion of at least one of said interconnecting board members is pushed toward said upper board unit by a reaction force to resiliently deform the at least one of said interconnecting board members, thereby driving said middle portion to convert said tact switch from a initial state to a triggered state; and wherein said intermediate unit is made of metal and is configured as a one-piece component, said surrounding frame member of said intermediate unit being substantially rectangular ring-shaped and including four corner portions, each of said interconnecting board members of said intermediate unit being elongated plate-shaped and interconnecting said middle portion of said intermediate unit and a respective one of said corner portions.

2. The pressing device as claimed in claim 1, wherein each of said interconnecting board members of said intermediate unit further includes a main board portion and a groove that is formed in said main board portion, said supporting portion of each of said interconnecting board members being L-shaped and being integrally formed with said main board portion of said interconnecting board member, said supporting portion of each of said interconnecting board members corresponding in position to said groove of said interconnecting board member.

3. The pressing device as claimed in claim 2, further comprising a plurality of screw members that respectively fasten said supporting portions of said interconnecting board members of said intermediate unit on said base board.

4. The pressing device as claimed in claim 3, wherein said base board has a top surface, a bottom surface opposite to said top surface, and a plurality of through holes, each of said through holes extending from said bottom surface to said top surface, said supporting portion of each of said interconnecting board members of said intermediate unit having a screw hole that is aligned with a respective one of said through holes, each of said screw members of said pressing device extending through a respective one of said through holes and threadedly engaging said screw hole of said supporting portion of the respective one of said interconnecting board members.

5. The pressing device as claimed in claim 1, further comprising a frame pad that is disposed between said intermediate unit and said circuit board of said upper board unit, and that is substantially rectangular ring-shaped.

\* \* \* \* \*